United States Patent [19]

Santos

[11] Patent Number: 4,595,160
[45] Date of Patent: Jun. 17, 1986

[54] WING TIP AIRFOILS

[76] Inventor: Jonathan Santos, 2902 Tapered La., Bowie, Md. 20715

[21] Appl. No.: 495,804

[22] Filed: May 18, 1983

[51] Int. Cl.[4] .................................................. B64C 5/08
[52] U.S. Cl. ..................................... 244/199; 244/91
[58] Field of Search ............... 244/199, 91, 35 R, 45 R

[56] References Cited

U.S. PATENT DOCUMENTS

| | | | |
|---|---|---|---|
| 1,112,126 | 9/1914 | Emmons | 244/35 R |
| 2,576,981 | 12/1951 | Vogt | 244/199 |
| 2,743,888 | 5/1956 | Lippisch | 244/199 |
| 3,270,988 | 9/1966 | Cone, Jr. | 244/199 |
| 3,712,564 | 1/1973 | Rethorst | 244/199 |
| 3,997,132 | 12/1976 | Erwin | 244/199 |
| 4,108,403 | 8/1978 | Finch | 244/199 |
| 4,172,574 | 10/1979 | Spillman | 244/199 |
| 4,190,219 | 2/1980 | Hackett | 244/199 |
| 4,272,043 | 6/1981 | Spillman | 244/199 |
| 4,377,267 | 3/1983 | Haworth | 244/199 |

OTHER PUBLICATIONS

Jordan, "Development of Test Methods for Scale Model Simulation . . . ", NASA Langley Res. Conf., 1980, Gulfstreamer, vol. 5, No. 6, Winter 1976.

Primary Examiner—Galen L. Barefoot
Attorney, Agent, or Firm—Karl A. Limbach

[57] ABSTRACT

The subject invention relates to a new and improved airfoil design. More particularly, an airfoil design is disclosed which improves efficiency by taking advantage of the vortex created at the wing tips.

3 Claims, 4 Drawing Figures

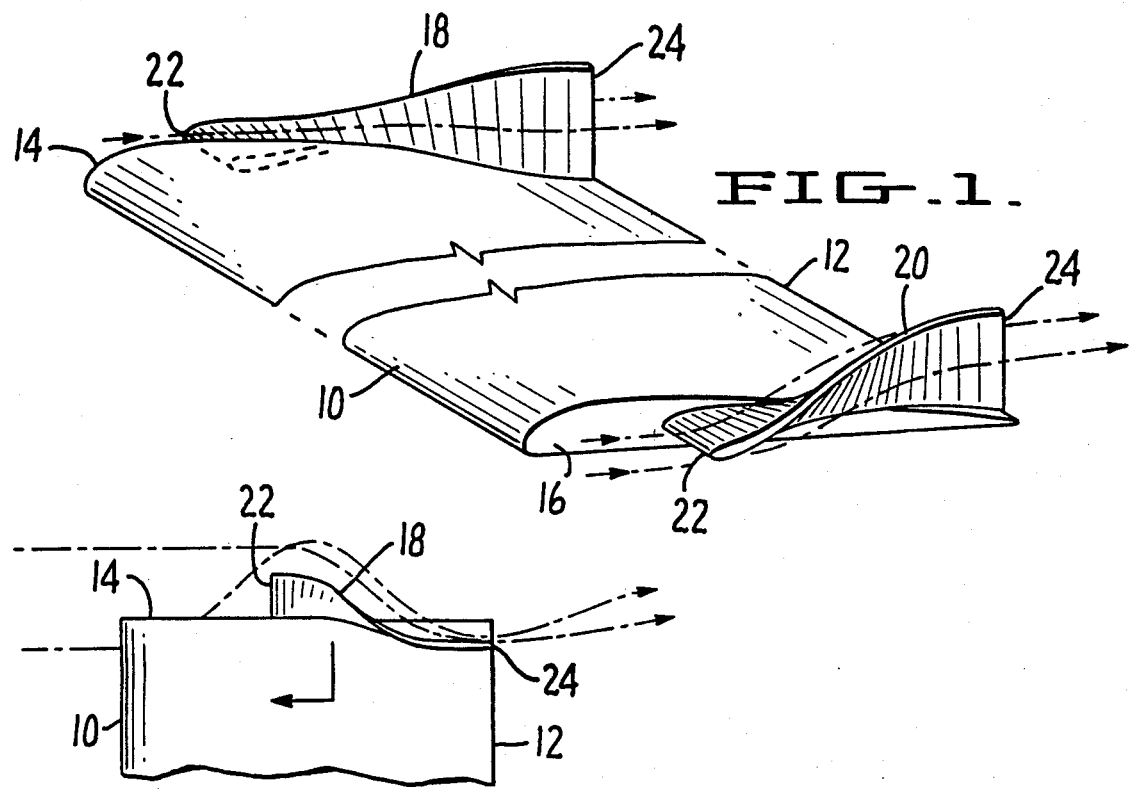
FIG. 1.
FIG. 2.
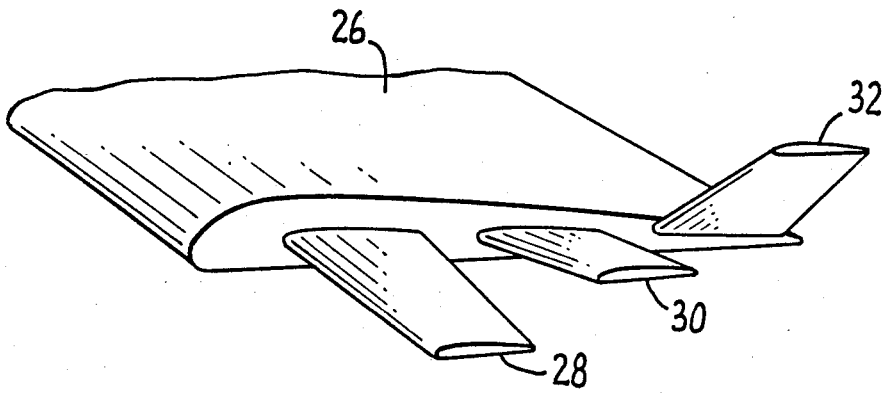
FIG. 3.
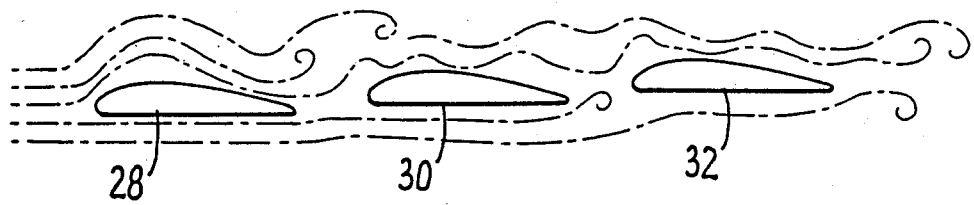
FIG. 4.

WING TIP AIRFOILS

BACKGROUND OF INVENTION

This invention relates to aircraft wing design, and more particularly to control of the trailing vortex at the wing tips of aircraft.

The vortex is a swirling mass of air created around the wing tips by the differences in pressure. In the prior art, the majority of the work done relating to vortex management relates to preventing its formation. The most efficient tip vortex devices can produce a maximum of 10% improvement in fuel efficiency.

When a turbulence is created then eliminated by some mechanical means, a large amount of energy is lost. It is an object of this invention to utilize the energy instead of wastefully trying to eliminate it.

SUMMARY OF INVENTION

In accordance with this invention, I provide aerodynamic surfaces at the wing tips, including a plurality of cambered surface areas with increasing dihedral angles and progressive changing angles of attack with respect to the wing chord, extending in the spiral direction of the vortices and aerodynamically coupled together. The surface areas may be separate as the outstrechted tip feathers of an eagle are placed in such a way that the vortex becomes an aid. Each one of those feathers utilizes the vortex in the same way a yacht makes use of a cross-wind. The surface areas may also be integrated into a single continuous device having the multiple cambered surface area following each other with increasing dihedral angles and progressive changing angles of attack.

BRIEF DESCRIPTION OF THE DRAWINGS

Two embodiments of my invention are shown in the attached drawing in which:

FIG. 1 is a perspective of a wing constructed in accordance with my invention with an integrated spiral of cambered surfaces with increasing dihedral angles and progressive changing angles of attack on each wing tip. The broken section in the middle of the wing indicates that a fuselage may be present between the wing tips, FIG. 2 is a top view of the right wing tip in FIG. 1 showing air flow, FIG. 3 is a perspective view of a left wing tip of another form of my invention where the plurality of cambered surface areas with increasing dihedral angles and progressive changing angles of attack are provided on separate winglets which follow each other aerodynamically in the vortex, and FIG. 4 is an end view of the structure of FIG. 3 taken along a curved plane normal to the spans of the multiple airfoils of FIG. 3.

DETAILED DESCRIPTION OF THE PREFERRED EMBODIMENTS

Referring now in detail to the drawing, the wing illustrated in FIG. 1 has a chord with leading and trailing edges 10 and 12, respectively, and right and left wing tips 14 and 16, respectively. Mounted on the wing tips are chambered aerodynamic surfaces 18 and 20 having leading and trailing edges 22 and 24. The airfoils 18 and 20 have progressive surface portions with increasing dihedral angles and progressive changing angles of attack in the directions of the spirals of the two trailing vortices. It will be noted that the two airfoils 18 and 20 spiral in opposite directions upwardly from the chord of the wing as the two vortices spiral in opposite directions.

As illustrated in FIGS. 3 and 4, the progressive cambered surfaces may be provided on distinct airfoils. As illustrated in FIGS. 3 and 4, a left wing tip 26 is provided with three cambered winglets 28, 30 and 32 which are arranged at increasing dihedral angles and progressive changing angles of attack aerodynamically coupled to each other so that each of the trailing winglets 30 and 32 flies in the wake of the winglets 28 and 30, respectively upstream of it.

I claim:

1. An improved wing design for an aircraft, said wing having opposite ends separated from each other in a span-wise direction, with said wing generating trailing vortices at said opposite ends with the vortices turning in opposite spirals, said improvement comprising:

a pair of structural airfoils means on said opposite wing ends, with each said airfoil means having cambered surface area extending in the spiral directions of the vortices and aerodynamically coupled together with increasing dihedral angle in the flow direction, progressive changing angles of attack with respect to the chord of the wing and the leading edge of each of said airfoil means being substantially parallel to the leading edge of its respective wing so that each of said airfoils generates additional lift from the trailing vortex and simultaneously reduces the energy in the trailing vortex.

2. An improved wing as recited in claim 1 wherein the airfoil means on each end of the wing has a continuous cambered surface extending in the spiral directions of the vortices with a leading edge which is aft of the wing leading edge and outboard of the end of the wing.

3. The improved wing as recited in claim 1 where the airfoil means extends through about 90 degrees of the spiral of the vortex.

* * * * *